(12) United States Patent
Jang et al.

(10) Patent No.: US 9,967,562 B2
(45) Date of Patent: May 8, 2018

(54) METHOD, DEVICE AND SYSTEM FOR CHANGING QUANTIZATION PARAMETER FOR CODING UNIT IN HEVC

(71) Applicant: SAMSUNG ELECTRONICS CO., LTD., Suwon-si, Gyeonggi-do (KR)

(72) Inventors: Hyuk Jae Jang, Suwon-si (KR); Nyeong Kyu Kwon, Daejoen (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 968 days.

(21) Appl. No.: 14/266,028

(22) Filed: Apr. 30, 2014

(65) Prior Publication Data

US 2014/0328390 A1 Nov. 6, 2014

(30) Foreign Application Priority Data

May 2, 2013 (KR) .................. 10-2013-0049264

(51) Int. Cl.
| | |
|---|---|
| H04N 19/134 | (2014.01) |
| H04N 19/124 | (2014.01) |
| H04N 19/159 | (2014.01) |
| H04N 19/169 | (2014.01) |
| H04N 19/146 | (2014.01) |

(52) U.S. Cl.
CPC ......... *H04N 19/124* (2014.11); *H04N 19/146* (2014.11); *H04N 19/159* (2014.11); *H04N 19/169* (2014.11)

(58) Field of Classification Search
CPC .. H04N 19/124; H04N 19/159; H04N 19/146; H04N 19/169
See application file for complete search history.

(56) References Cited

U.S. PATENT DOCUMENTS

| | | | |
|---|---|---|---|
| 6,522,693 B1 * | 2/2003 | Lu ........................ | H04N 19/176 375/240.02 |
| 7,151,856 B2 * | 12/2006 | Uchibayashi ............. | G06T 9/00 375/240.16 |
| 7,227,894 B2 * | 6/2007 | Lin ...................... | H04N 19/105 375/240.12 |
| 7,602,851 B2 | 10/2009 | Lee et al. | |

(Continued)

FOREIGN PATENT DOCUMENTS

| | | |
|---|---|---|
| JP | 2009141688 | 6/2009 |
| KR | 1020110134319 | 12/2011 |

(Continued)

*Primary Examiner* — Sath V Perungavoor
*Assistant Examiner* — Philip Dang
(74) *Attorney, Agent, or Firm* — F. Chau & Associates, LLC (57) ABSTRACT

A method of individually setting the quantization parameter for each coding unit of a frame in high efficiency video coding (HEVC) is disclosed. The method for setting a quantization parameter for each coding unit in a frame for HEVC encoding includes receiving at least one of partition size information of the coding unit and prediction mode information of the coding unit, performing an adaptive bit allocation operation per each coding unit based on at least one of the unit partition size information of the coding unit and the prediction mode information of the coding unit, and setting a quantization parameter per each coding unit according to the performed adaptive bit allocation operation.

18 Claims, 10 Drawing Sheets

(56) References Cited

U.S. PATENT DOCUMENTS

| | | | |
|---|---|---|---|
| 7,784,076 B2 * | 8/2010 | Demircin | H04N 19/172 370/465 |
| 7,797,723 B2 * | 9/2010 | Demircin | H04N 21/2365 370/235 |
| 7,936,818 B2 * | 5/2011 | Jayant | H04N 19/00 375/240.05 |
| 7,961,783 B2 * | 6/2011 | Kwon | H04N 19/176 375/240.03 |
| 8,077,772 B2 * | 12/2011 | Mauchly | H04N 19/176 375/240.01 |
| 8,259,798 B2 | 9/2012 | Jeon et al. | |
| 8,356,327 B2 * | 1/2013 | van Beek | H04N 21/2343 370/231 |
| 2005/0084015 A1 | 4/2005 | Han et al. | |
| 2007/0153916 A1 * | 7/2007 | Demircin | H04N 21/2365 375/240.26 |
| 2007/0280350 A1 | 12/2007 | Mathew et al. | |
| 2009/0225829 A2 * | 9/2009 | Kwon | H04N 19/176 375/240.03 |
| 2011/0090960 A1 * | 4/2011 | Leontaris | H04N 19/103 375/240.12 |
| 2012/0051438 A1 * | 3/2012 | Chong | H04N 19/176 375/240.25 |
| 2012/0082243 A1 * | 4/2012 | Baylon | H04N 19/619 375/240.26 |
| 2012/0136657 A1 * | 5/2012 | Shirakawa | G10L 19/0204 704/229 |
| 2012/0170646 A1 * | 7/2012 | Baylon | H04N 19/619 375/240.02 |
| 2012/0177109 A1 * | 7/2012 | Ye | H04N 19/197 375/240.03 |
| 2012/0183080 A1 | 7/2012 | Zhou | |
| 2012/0189052 A1 | 7/2012 | Karczewicz et al. | |
| 2012/0243611 A1 * | 9/2012 | Kondo | H04N 19/117 375/240.16 |
| 2013/0034170 A1 * | 2/2013 | Chen | H04N 13/00 375/240.25 |
| 2013/0051457 A1 * | 2/2013 | Joshi | H04N 19/147 375/240.03 |
| 2013/0064293 A1 * | 3/2013 | Song | H04N 19/159 375/240.03 |
| 2014/0328397 A1 * | 11/2014 | Jeon | H04N 19/61 375/240.12 |

FOREIGN PATENT DOCUMENTS

| | | |
|---|---|---|
| KR | 1020120012634 | 2/2012 |
| KR | 1020120096863 | 8/2012 |
| KR | 1020120096911 | 8/2012 |
| WO | WO 2011/019384 A1 * | 2/2011 |

\* cited by examiner

Frame

METHOD, DEVICE AND SYSTEM FOR CHANGING QUANTIZATION PARAMETER FOR CODING UNIT IN HEVC

CROSS-REFERENCE TO RELATED APPLICATIONS

This application claims priority under 35 U.S.C. § 119 to Korean Patent Application No. 10-2013-0049264 filed on May 2, 2013, the disclosure of which is incorporated by reference in its entirety.

1. TECHNICAL FIELD OF THE INVENTION

Embodiments of the present inventive concept relate to a video encoding technology, and more particularly to a method, a device, and a system for changing quantization parameter for a coding unit in a high efficiency video coding standard (HEVC).

2. DISCUSSION OF THE RELATED ART

The HEVC (High Efficiency Video Coding) is a video compressed standard, a successor to 11.264/MPEG-4 AVC (Advanced Video Coding), that was jointly developed by the ISO/IEC Moving Picture Experts Group (MPEG) and ITU-T Video Coding Experts Group (VCEG) as ISO/IEC 23008-2 MPEG-4 Part 2 and ITU-T H.265. MPEG and VCEG established a Joint Collaborative Team on Video Coding (JCT-VC) to develop the HEVC standard. HEVC is said to double the data compression ratio compared to H.264/MPEG-4 AVC at the same level of video quality. It can alternatively be used to provide substantially improved video quality at the same bit rate.

SUMMARY

An aspect of the present invention is directed to provide a method of changing a quantization parameter for a coding unit in HEVC, including receiving at least one of coding unit partition size information and prediction mode information, performing an adaptive bit allocation operation per coding unit based on at least one of the coding unit partition size information and the prediction mode information, and changing a quantization parameter per the coding unit according to the performed adaptive bit allocation operation. An aspect of the present invention provides a method for improving a visual quality of video in the HEVC.

An aspect of the present invention is directed to provide a method of individually setting the quantization n parameter for each coding unit of a frame in high efficiency video coding (HEVC) is disclosed. The method for setting a quantization parameter for each coding unit in a frame for HEVC encoding includes receiving at least one of the partition size information of the coding unit and the prediction mode information of the coding unit, performing an adaptive bit allocation operation per each coding unit based on at least one of the unit partition size information of the coding unit and the prediction mode information of the coding unit, and setting the quantization parameter per each coding unit according to the performed adaptive bit allocation operation.

In performing the adaptive bit allocation operation, the bit allocation operation is performed in proportion to the partition size of the coding unit.

The coding unit is included in the largest coding unit. The bit allocation size of the coding unit is calculated by multiplying a target bit number of the LCU and a weighted value.

When the partition size of the coding unit is greater than the partition size of other coding units, a weighted value of the coding unit is smaller than a weighted value of the other coding units. When the partition size of the coding unit is smaller than the partition size of other coding units, a weighted value of the coding unit is greater than a weighted value of the other coding units.

Considering four statistical information of the coding unit such as activity, smoothness, darkness, and static, if the coding unit has a flat characteristic, a relatively small weighted value is allocated, and if the coding unit has a complicated characteristic, a relatively great weighted value is allocated.

When the statistical characteristic of the coding unit has a flat characteristic, a weighted value of the coding unit is smaller than a weighted value of the other coding units. When the statistical characteristic of the coding unit has a complicated characteristic, a weighted value of the coding unit is greater than a weighted value of the other coding units.

The prediction mode information indicates whether the coding unit is in an intra mode, an inter mode, a skip mode, or a merge mode. When the coding unit is in the intra mode, a weighted value of the coding unit is greater than a weighted value of other modes.

When the coding unit is in the inter mode, a weighted value of the coding unit is smaller than the weighted value of the intra mode.

When the coding unit is in the skip mode or the merge mode, a weighted value of the coding unit is smaller than a weighted value of the intra mode and a weighted value of the inter mode.

An aspect of the present inventive concept is directed to provide a video encoder, including a bit allocation unit performing an adaptive bit allocation operation per coding unit based on at least one of coding unit partition size information and prediction mode information, and a quantization parameter control unit changing a quantization parameter per the coding unit according to the preformed adaptive bit allocation operation.

According to an exemplary embodiment, the video encoder may further include a video source analyzer receiving video source data partitioned into coding units and analyzing the partitioned video source data. According to an exemplary embodiment, the video encoder may further include a QP offset control unit controlling an offset of the quantization parameter according to the analysis.

An aspect of the inventive concept is directed to provide a system, including the video encoder, and a video decoder decoding compressed bitstream output from the video encoder and outputting video data.

An aspect of the present inventive concept is directed to provide a system, including the video encoder, and a radio transceiver transmitting a compressed bitstream output from the video encoder.

An aspect of the present inventive concept is directed to provide a system comprising: the encoder as described and claimed herein, being configured to encode a sequence of video frames; a processor configured to control the encoding operation of the encoder; a memory configured to store executable code for at least one of the processor and the encoder. The system may further comprise: a decoder configured to decompress the sequence of video frames previously encoded by the encoder.

The inventive concept now will be described more fully hereinafter with reference to the accompanying drawings, in Which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of circuits and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and the are intended to include the plural forms as well, unless the context clearly indicates otherwise.

BRIEF DESCRIPTION OF THE DRAWINGS

These and/or other aspects and features of the inventive concept will become apparent and more readily appreciated from the following description of the embodiments, taken in conjunction with the accompanying drawings, in which.

DETAILED DESCRIPTION OF THE EXEMPLARY EMBODIMENTS

Figure 1:
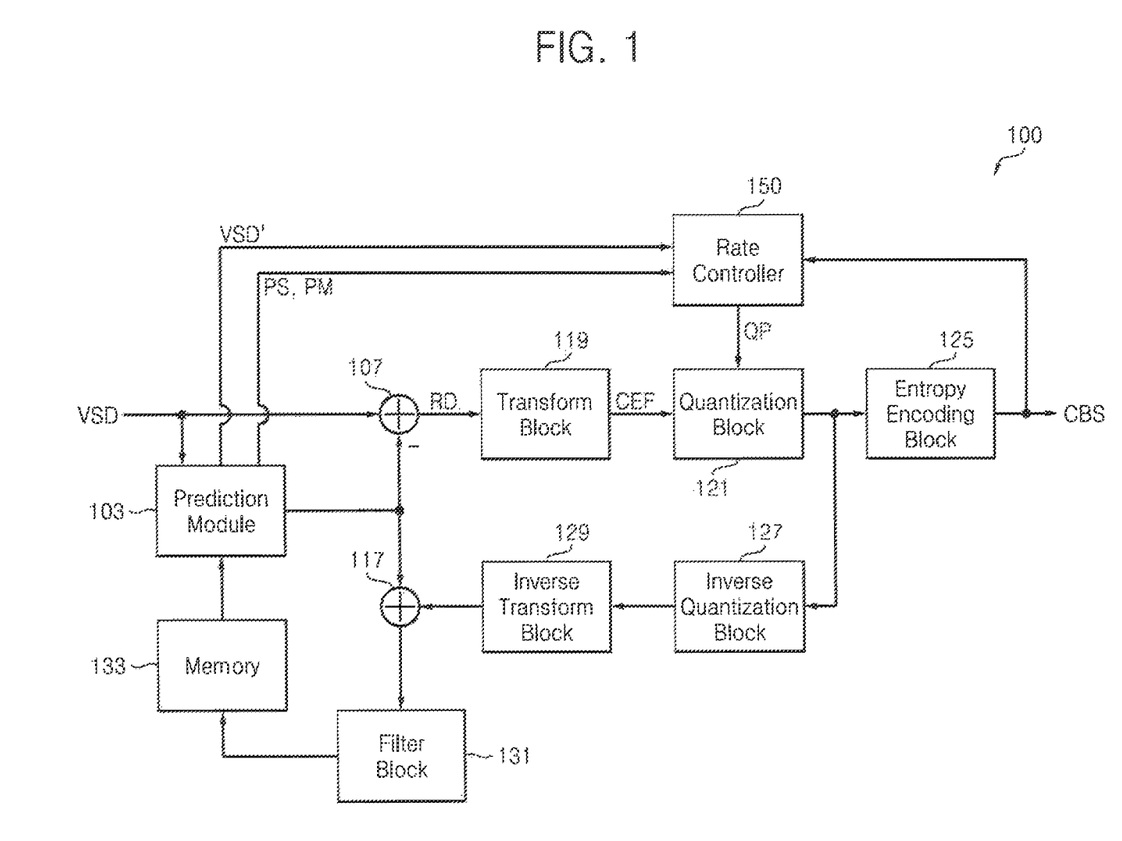
FIG. 1 is a block diagram of a video encoder according to an exemplary embodiment of the inventive concept.
Figure 9:
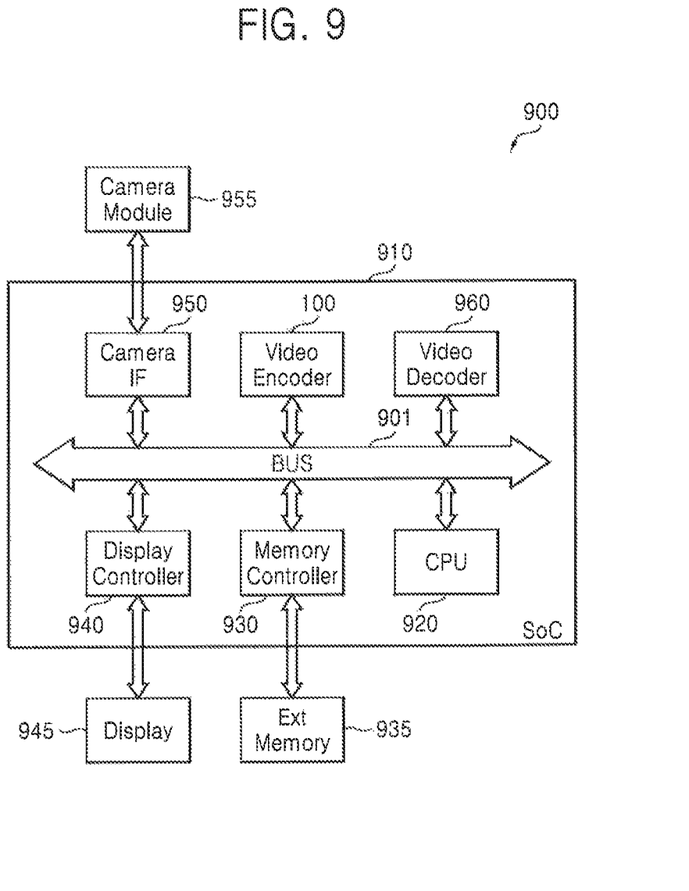
FIG. 9 is a block diagram depicting an exemplary embodiment of a system including the video encoder of FIG. 1.
Figure 10:
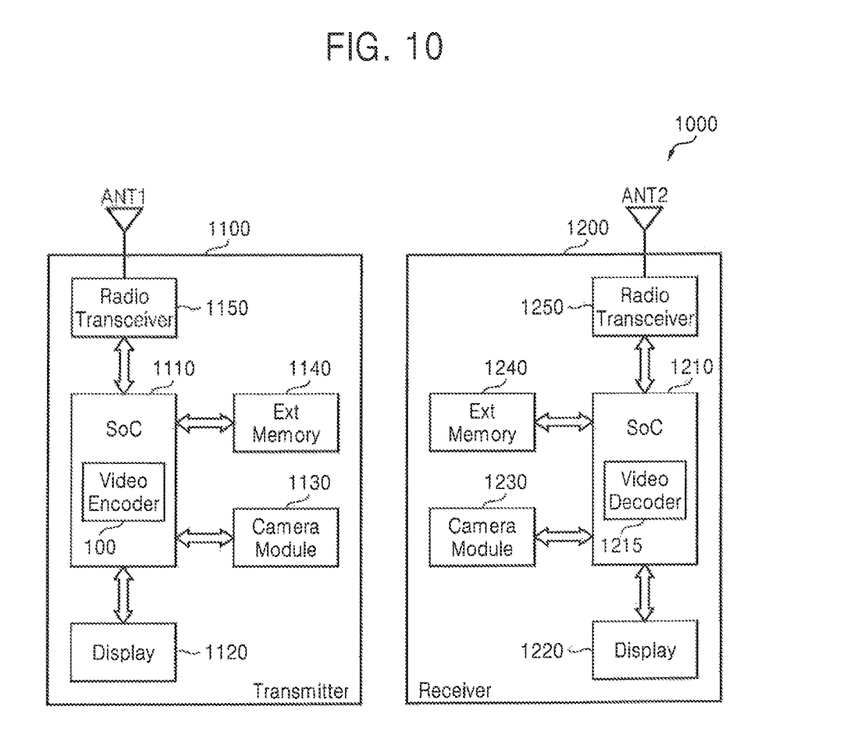
FIG. 10 is a block diagram depicting an exemplary embodiment of a system including the video encoder of FIG. 1.

FIG. 1 is a block diagram of a video encoder according to an exemplary embodiment of the inventive concept. Referring to FIG. 1, a video encoder 100 compresses video source data VSD and outputs a compressed bitstream (CBS). The video source data may be uncompressed video frames obtained from a video camera (not shoe in FIG. 1) as shown in FIGS. 9 and 10.

The video encoder 100 includes a Prediction Module 103, a First Adder 107, a Transform Block 119, a Quantization Block 121, an Entropy Encoding Block 125, an Inverse Quantization Block 127, an inverse Transform Block 129, a Second Adder 117, a Filter Block 131, a Memory 133, and a Rate Controller 150.

Each module or a block in the inventive concept may be dedicated hardware circuit which may dedicated to perform a specific function and an operation according to each module or block's title as described in the inventive concept. Each module or a block may be implemented as a computer program code, executable by a processor, which may perform a the module or block's specific functions and operations. The executable code may be stored in a recording medium, e.g., a nonvolatile memory, installed and storing the computer program code which may perform the specific functions and operations.

A module or a block may be a functional and/or structural combination of hardware for performing a technical concept of the inventive concept and software for driving the hardware.

The Prediction Module 103 receives video source data VSD from a camera (not shown) or an external memory (not shown), and generates partitioned video source data VDS' from coding units based on the received video source data VSD. The video source data VSD may have YUV values, RGB values, or YCoCg values.

Figure 2:
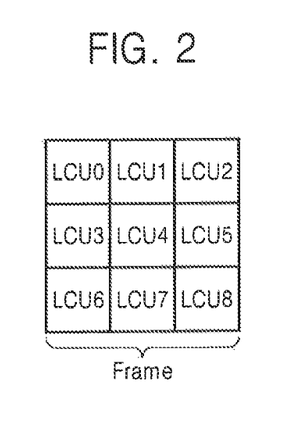
FIG. 2 is a diagram of a frame input to the video encoder shown in FIG. 1.

FIG. 2 is a diagram of a video frame input to the video encoder shown in FIG. 1. Referring to FIGS. 1 and 2, the Prediction Module 103 partitions the video source data VSD into a plurality of largest coding units (e.g., blocks LCU0 to LCU8) according to HEVC partitioning.

The video source data VSD may be sequence of frames or frame data. The number of the largest coding units LCU0 to LCU8 is changed according to the size of the frame of the video source data VSD and the size of the largest coding unit LCU. Each of the largest coding units may have a special size (e.g., 64×64 pixels or 64×64 pixel data).

Figure 3:
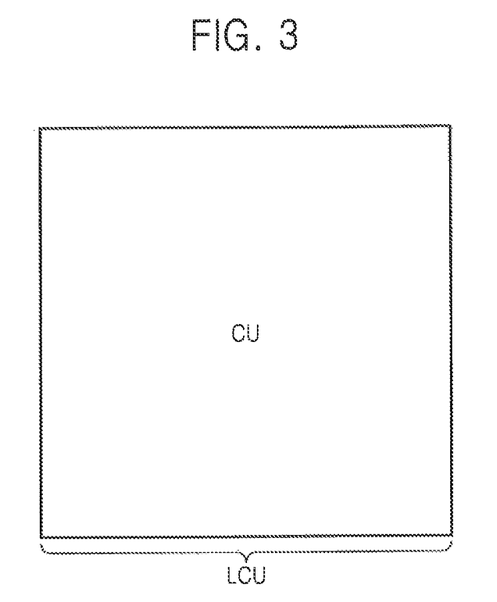
FIG. 3 is a diagram depicting an exemplary embodiment of a largest coding unit (LCU) shown in FIG. 2.

FIG. 3 is a diagram depicting an exemplary embodiment of one largest coding unit (LCU) (e.g., LCU0) shown in FIG. 2. Referring to FIGS. 1 to 3, the Prediction Module 103 partitions each of the largest coding units LCU0 to LCU8 into one or more coding units (CU).

The number of coding units per LCU may be determined in advance. For example, LCU may be partitioned into one CU. For example, the Prediction Module 103 generates coding unit partition size information PS indicating that the size of one CU is 64×64 pixels. The coding unit partition size information PS indicates size information of CU included in LCU.

Figure 4:
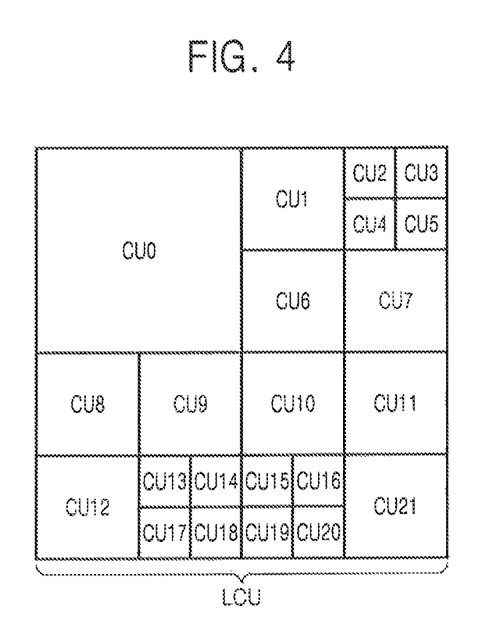
FIG. 4 is a diagram depicting another exemplary embodiment of the LCU shown in FIG. 2.

FIG. 4 is a diagram depicting another exemplary embodiment of one LCU shown in FIG. 2. Referring to FIGS. 1, 2, and 4. LCU may be partitioned into a plurality of coding units CU0 to CU21 of various sizes according to an exemplary embodiment.

The size of each of the coding units CU0 to CU21 may be varied. For example, the size of each of the coding units CU0 to CU21 may be selected from among 32×32 pixels (or 32×32 pixel data), 16×16 pixels (or 16×16 pixel data), and 8×8 pixels (or 8×8 pixel data).

The Prediction Module 103 generates coding unit partition size information PS indicating that the size of each of the coding units CU0 to CU21 is one of 32×32 pixels, 16×16 pixels, and 8×8 pixels. The Prediction Module 103 may include a motion estimator (not shown) and a motion compensator (not shown).

The motion estimator determines a motion vector, between frames, for each coding unit, or for macroblocks therein. The motion compensator generates a prediction unit or prediction block based on the motion vector. The size of the prediction unit/block may be smaller than the size of a coding unit. According to the mode of (e.g., an intra mode), the Prediction Module 103 instead of the motion compensator may generate the prediction unit/block using other known methods.

The Prediction Module 103 generates prediction mode information PM. The prediction mode information PM indicates whether a coding unit is in an intra mode, an inter mode, a skip mode, or a merge mode.

The intra mode is defined to generate the prediction unit/blocks by using other pixels already encoded in a current video frame. The inter mode is defined to generate the prediction unit/block by using pixels in a previous video frame or a future video frame.

The skip mode is defined to be similar to the intra mode without an operation by the Transform Block 119. The merge mode is similar to the intra mode, but is defined to be that a plurality of prediction units are merged with each other.

Figure 5:
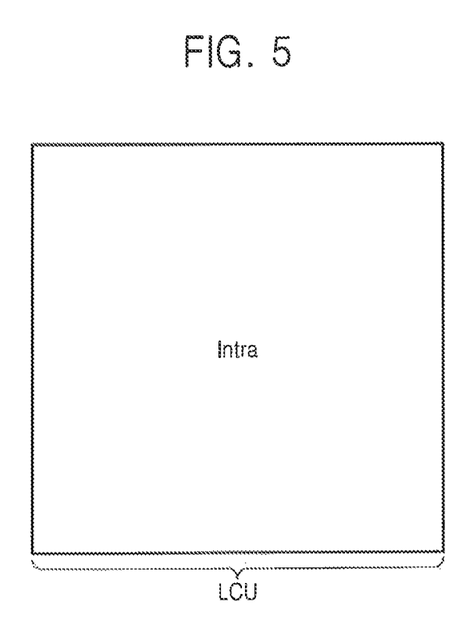
FIG. 5 is a diagram depicting an exemplary embodiment of a prediction mode of the LCU shown in FIG. 3.

FIG. 5 is a diagram depicting an exemplary embodiment of a prediction mode of the LCU shown in FIG. 3. Referring to FIGS. 1, 3, and 5, an LCU may be encoded in an intra mode. The Prediction Module 103 generates prediction mode information PM indicating that all of the LCU is to be encoded in the intra mode.

Figure 6:
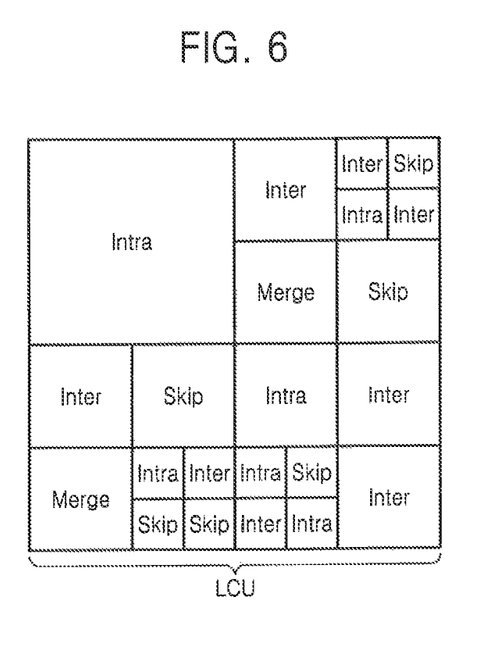
FIG. 6 is a diagram depicting another exemplary embodiment of the prediction mode of the LCU shown in FIG. 4.

FIG. 6 is a diagram depicting another exemplary embodiment of the prediction mode of the LCU shown in FIG. 4. Referring to FIGS. 1, 4, and 6, each of coding units included in the exemplary LCU shown in FIG. 6 may be individually encoded in an intra mode, an inter mode, a skip mode, and a merge mode. The Prediction Module 103 generates prediction mode information PM indicating whether each of the coding units is to be encoded in an intra mode, an inter mode, a skip mode, and a merge mode.

Referring to FIG. 1, the First Adder 107 subtracts the prediction unit generated by the Prediction Module 103 from the video source data VSD to generate a residual data RD. According to an exemplary embodiment, the residual data RD may be referred to as a transition unit.

The Transform Block 119 may applies a mathematical transform to the residual data RD output from the First Adder 107. The transform may be discrete cosine transform (DCT) or similar transform defined by HEVC standard. The Transform Block 119 generates residual transform coefficients (CEF). The Transform Block 119 transforms the pixel region into frequency data.

The Quantization Block 121 quantizes the residual transform coefficients CEF according to a quantization parameter QP so as to further reduce the bit rate. The Rate Controller 150 changes the quantization parameter QP per coding unit based on the video source data VDS' partitioned into coding units, the coding unit partition size information PS output from the Prediction Module 103, the prediction mode information PM, or the compressed bitstream CBS output from the Entropy Encoding Block 125. A detailed operation of the Rate Controller 150 will be described in detail with reference to FIG. 7.

After quantization is performed on the residual transform coefficients CEF, the Entropy Encoding Block 125 outputs the compressed bitstream CBS for storage or transmission.

An Inverse Quantization Block 127 performs an inverse quantization operation and then the inverse Transform Block 129 performs an inverse transformation operation, so as to reconstruct quantized residual transform coefficients that are in a frequency data into a reconstructed pixel region.

The Second Adder 117 adds the reconstructed residual data and a prediction unit generated by the Prediction Module 103 to output reconstructed video data. The Filter Block 131 applies filtering to the reconstructed video data so as to improve video quality. The memory 133 stores the filtered video data and outputs the filtered video data to the Prediction Module 103.

Figure 7:
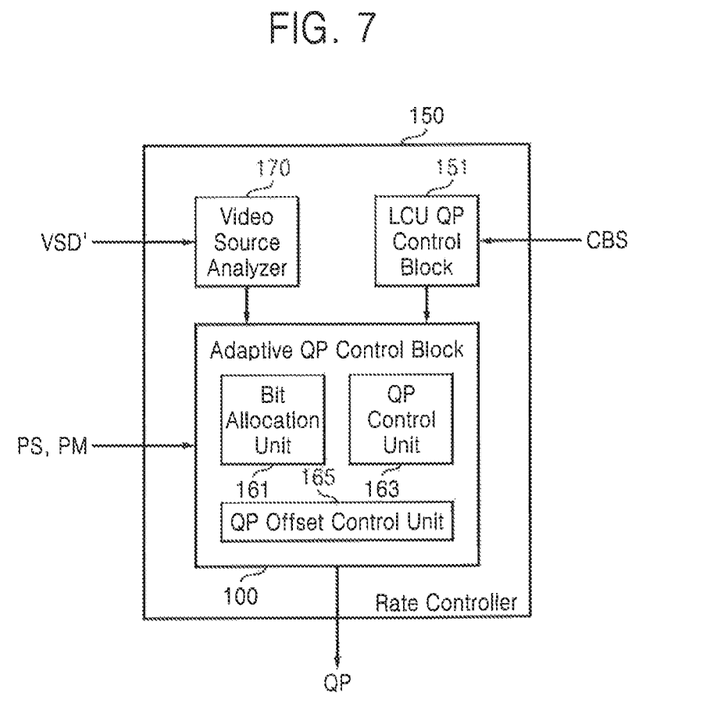
FIG. 7 is a block diagram of a Rate Controller shown in FIG. 1.

FIG. 7 is a block diagram of the Rate Controller shown in FIG. 1. Referring to FIGS. 1, 4, 6, and 7, the Rate Controller 150 changes the quantization parameter QP per coding unit based on the coding unit partition size information PS output from the Prediction Module 103, prediction mode information PM, or the compressed bitstream CBS output from the Entropy Encoding Block 125.

The Rate Controller 150 includes a LCU QP control block 151 and an adaptive QP control block 160. The LCU QP control block 151 receives the compressed bitstream CBS from the Entropy Encoding Block 125. The LCU QP control block 151 calculates fullness state of a real decoder buffer using the compressed bitstream CBS and generates a LCU base quantization parameter according to the calculated fullness.

The adaptive QP control block 160 changes the quantization parameter QP per coding unit based on the coding unit partition size information PS, prediction mode information PM, or the LCU base quantization parameter, and outputs the quantization parameter QP to the Quantization Block 121.

The adaptive QP control block 160 includes a bit allocation unit 161 and a QP control unit 163.

The bit allocation unit 161 performs an adaptive bit allocation operation per coding unit based on at least one of the coding unit partition size information PS and the prediction mode information PM. The bit allocation unit 161 performs the bit allocation operation in proportion to the size of the coding units CU0 to CU21 shown in FIG. 4. For example, the size of a first coding unit CU0, e.g., 32×32 pixels, is greater than the size of a second coding unit CU1, e.g., 16×16 pixels, so that more bits may be allocated to the first coding unit CU0.

The bit allocation size of each of the coding units CU0 to CU21 is calculated by multiplying a target bit number of the LCU and a weighted value based on the size of a coding unit. This relationship may be expressed as shown in Equation 1:

$$R_{CUi} = T_{LCU} * W_{Ni} \qquad \text{[Equation 1]}$$

Wherein, $R_{Cui}$ is the bit allocation size of an $i^{th}$ coding unit, $T_{LCU}$ is a target bit number of the LCU (i.e., a target number of bits of the LCU), and $W_{Ni}$ is a weighted value based on the size of the $i^{th}$ coding unit. The sum of weighted values is One.

According to an exemplary embodiment, if the size of the first coding unit CU0, e.g., 32×32 pixels, is greater than the size of the second coding unit, e.g., 16×16 pixels, the weighted value of the first coding unit CU0, e.g., 0.2, is smaller than the weighted value of the second coding unit CU1, e.g., 0.4.

When the size of a third coding unit CU2, e.g., 8×8 pixels, is smaller than the size of the second coding unit CU1, e.g., 16×16 pixels, the weighted value of the third coding unit CU2, e.g., 0.6, is greater than the weighted value of the second coding unit CU1, e.g., 0.4.

According to another exemplary embodiment, the bit allocation size of each of the coding units CU0 to CU21 may be calculated by multiplying the target bit number of the LCU and a weighted value based on a prediction mode of the coding unit. This relationship may be expressed as shown in equation 2:

$$R_{CUi}=T_{LCU}*W_{MODi} \quad \text{[Equation 2]}$$

Wherein $R_{CUi}$ is the bit allocation size of $i^{th}$ coding unit, $T_{LCU}$ is a target bit number of the LCU, and $W_{MODi}$ is a weighted value based on a prediction mode of the $i^{th}$ coding unit. The sum of weighted values is One.

When a coding unit CU0 shown in FIG. 6 is in an intra mode, the weighted value of the coding unit CU0 is greater than the weighted value would be if in other modes, e.g., inter mode.

When a coding unit CU1 is in an inter mode, the weighted value of the coding unit CU1 is smaller than the weighted value would be in the intra mode. When a coding unit CU2 or CU3 is in a skip mode or a merge mode, the weighted value of the coding unit CU2 or CU3 is smaller than the weighted value would be in the intra mode or than the weighted value would be in the inter mode.

According to an exemplary embodiment, the Rate Controller 150 may further include the video source analyzer 170. The video source analyzer 170 receives video source data VSD' partitioned into coding units from the Prediction Module 103, and analyzes the partitioned video source data VSD'.

For example, the video source analyzer 170 analyzes activity, darkness, or static of the partitioned video source data VSD', and determines whether each coding unit CU2 or CU3 has homogeneity or complexity according to a result of the analysis.

Each bit allocation size of the coding units CU0 to CU21 may be determined according to the coding unit partition size information QP and a result of the analysis. This relationship may be expressed as shown in equation 3:

$$R_{CUi}=T_{LCU}*(\alpha W_{Ni}+\beta W_{STAi}) \quad \text{[Equation 3]}$$

Wherein $R_{CUi}$ is the bit allocation size of $i^{th}$ coding unit, $T_{LCU}$ is a target bit number of the LCU, and $W_{Ni}$ is a weighted value based on the size of the $i^{th}$ coding unit, and $W_{STAi}$ is a weighted value based on the analysis of the $i^{th}$ coding unit. Each of α and β has a range between Zero and One, and the sum of α and β is One.

According to a result of the analysis, if the coding unit CU0 has homogeneity, the coding unit CU0 may have a lower weighted value than other coding units.

As a result of the analysis, if the coding unit CU0 has complexity, the coding unit CU0 may have a higher weighted value than other coding units.

According to still another exemplary embodiment, the bit allocation size of each of the coding units CU0 to CU21 may be determined based on coding unit partition size information PS, prediction mode information PM, and an analysis result. This relationship may be expressed as shown in equation 4:

$$R_{CUi}=T_{LCU}*(\alpha W_{Ni}+\beta W_{STAi}+\tau W_{MODi}) \quad \text{[Equation 4]}$$

Wherein $R_{CUi}$ is the bit allocation size of $i^{th}$ coding unit, $T_{LCU}$ is a target bit number of the LCU, and $W_{Ni}$ is a weighted value based on the size of the $i^{th}$ coding unit, $W_{STAi}$ is a weighted value based on the analysis of the $i^{th}$ coding unit, and $W_{MODi}$ is a weighted value based on a prediction mode of the $i^{th}$ coding unit.

Each of α, β, and τ has a range between Zero and One, and the sum of α, β, and τ is One. The sum of weighted values based on the size of the $i^{th}$ coding unit is One, the sum of weighted values based on an analysis of the $i^{th}$ coding unit is One, and the sum of weighted values based on an $i^{th}$ prediction mode is One.

A QP control unit 121 changes a quantization parameter QP per each coding unit according to the performed adaptive bit allocation operation. Thus, each of the coding units may have a different value of quantization parameter QP. The QP control unit 121 may change the quantization parameter QP considering the LCU base quantization parameter.

By changing the quantization parameter QP per each coding unit, visual quality may be improved.

According to an exemplary embodiment, the Rate Controller 150 further includes a QP offset control unit 165 controlling an offset of the quantization parameter QP according to an analysis of the video source analyzer 170. The QP offset control unit 165 may change an offset of the quantization parameter QP according to the analysis.

Figure 8:
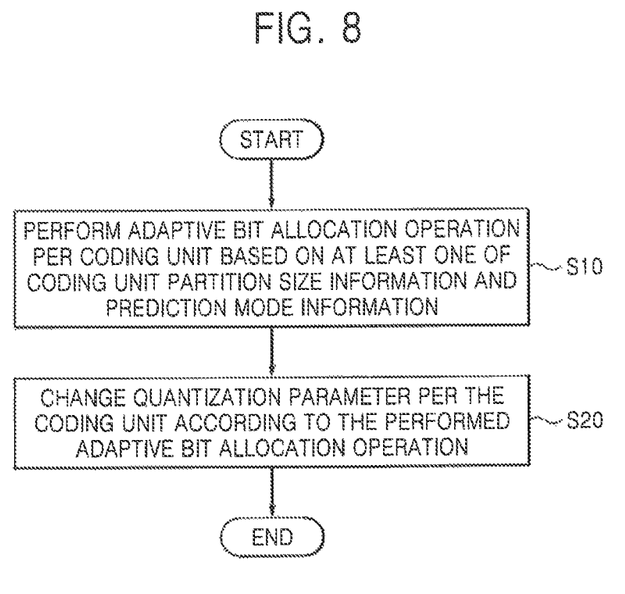
FIG. 8 is a flowchart for describing an operation of the Rate Controller shown in FIG. 1.

FIG. 8 is a flowchart for describing an operation of the Rate Controller 150 shown in FIG. 1. Referring to FIGS. 1, 4, 6, 7, and 8, the bit allocation unit 161 performs an adaptive bit allocation operation per each coding unit based on at least one of coding unit partition size information PS and prediction mode information PM (step S10).

The QP control unit 151 changes the quantization parameter QP per the coding unit according to the performed adaptive bit allocation operation (step S20).

FIG. 9 is a block diagram depicting an exemplary embodiment of a system including the video encoder 100 of FIG. 1.

Referring to FIGS. 1 and 9, a system 900 may be embodied in a portable device such as a mobile phone, a smart phone, a tablet PC, a laptop computer, a personal digital assistant (PDA), an enterprise digital assistant (EDA), a digital still camera, a digital video camera, a portable multimedia player (PMP), a personal navigation device or portable navigation device (PDN), a handheld game console, a mobile internet device (MID), or an e-book.

The system 900 includes a system on chip (SoC) 910 and an external memory 935. According to an exemplary embodiment, the system 900 may further include a display 945 and/or a camera module 955. The SoC 910 controls an operation of the external memory 935, of the display 945, and of the camera module 955.

According to an exemplary embodiment, the SoC 910 may be referred to as an integrated circuit (IC) processor, an application processor, a multimedia processor, or an integrated multimedia processor.

The SoC 910 includes a CPU 920, a Memory controller 930, a display controller 940, a camera interface 950, a video encoder 100, and a video decoder 960. According to well known design principles of microprocessor systems, the SoC 910 and/or the CPU may further include an internal random access memory (not shown) and registers (not shown) or cache memory, that can function as a main/system memory of the CPU 920.

Each of the components 920, 930, 940, 950, 100, and 960, and any internal random access memory (not shown) can communicate with each other through a system bus 901. According to an exemplary embodiment, architecture of the bus 901 may be various. The CPU 920 reads program commands (e.g., from the external memory 935) and executes the programs to control each of the components 920, 930, 940, 950, 100, and 960.

The memory controller 930 may transmit the compressed bitstream CBS output from the video encoder 100 to the external memory 935, and/or may transmit the compressed bitstream CBS stored in the external memory 935 to the video decoder 960 for decoding.

The external memory 935 may be a volatile memory and/or a non-volatile memory. The volatile memory may be a dynamic random access memory (DRAM), a static random access memory (SRAM), a thyristor RAM (T-RAM), a zero capacitor RAM (Z-RAM), or a Twin Transistor RAM (TTRAM). The non-volatile memory may be an Electrically Erasable Programmable Read-Only Memory (EEPROM), flash memory, a Magnetic RAM (MRAM), a Phase change RAM (PRAM), or a resistive memory.

The display controller 940 controls the display 945 so that video data decoded by the video decoder 960 may be displayed on the display 945. The display 945 may be a liquid crystal display (LCD), a light emitting diode (LED) display, an organic light emitting diode (OLED) display, an active-matrix organic light-emitting diode (AMOLED) display, or a flexible display.

The camera module 955 denotes a module capturing an optical scene and converting light into an electrical signal or binary data representing an image or sequence of images. An electrical image signal output from the camera module 955 preferably has a YUV pixel format. The electrical image signal may be the video source data VSD of FIG. 1. The electrical image signal is transmitted as digital frame data to the video encoder 100 through the camera interface 950 for encoding.

The video encoder 100 is the video encoder 100 of FIG. 1.

The video decoder 960 decodes the compressed bitstream CBS to display the video data on the display 945, and outputs the video data to the display 945. As is well known by persons skilled in the art, in alternative implementations, the video decoder 960 may be directly connected by a second bus (not shown) to the Display Controller 940, to reduce the uncompressed video data traffic upon the system Bus.

FIG. 10 is a block diagram depicting an exemplary embodiment of a system including the video encoder 100 of FIG. 1. Referring to FIGS. 1 and 10, a system 1000 includes a transmitter 1100 and a receiver 1200, which may be separated from each other by a space. Each of the transmitter 1100 and the receiver 1200 may be a mobile phone, a smart phone, a mobile internet device, or a tablet PC.

The transmitter 1100 includes a first SoC 1110, a display 1120, a camera module 1130, an external memory 1140, and a radio transceiver 1150. The operations and functions of each of the first SoC 1110, the display 1120, the camera module 1130, and the external memory 1140 are similar to the operations and a functions of the SoC 910, the display 945, the camera module 955, and the external memory 935 of FIG. 9, so that a redundant detailed description thereof is omitted.

The first SoC 1110 includes the video encoder 100 shown in FIG. 1. The radio transceiver 1150 can transmit the compressed bitstream CBS to the receiver 1200 via a first antenna ANT1. The transmitter 1100 may also operate as a receiver.

The receiver 1200 includes a second SoC 1210, a display 1220, a camera module 1230, an external memory 1240, and a radio transceiver 1250. The operations and functions of each of the SoC 1210, the display 1220, the camera module 1230, and the external memory 1240 are similar to the operations and functions of the SoC 910, the display 945, the camera module 955, and the external memory 935 shown in FIG. 9, so that a redundant detailed description thereof is omitted.

The second SoC 1210 includes the video decoder 1215. The radio transceiver 1250 an receive the compressed bitstream CBS from the transmitter 1100 via a second antenna ANT2. The receiver 1200 may also operate as a transmitter. The video decoder 1215 can decode the compressed bitstream CBS to display video data on the display 1220 and output the resulting uncompressed video data.

A method and a device which can change the quantization parameter for a coding unit in HEVC according to an exemplary embodiment of the inventive concept can perform an adaptive bit allocation operation per each coding unit based on coding unit partition size information, prediction mode information, or coding unit region analysis information and change a quantization parameter, thereby improving the visual quality.

While the inventive concept have been particularly shown and described with reference to example embodiments thereof, it will be understood by those of ordinary skill in the art that various changes in forms and details may be made therein without departing from the spirit and scope of the inventive concept as defined by the following claims.

What is claimed is:

1. A method of changing quantization parameters for encoding a plurality of coding units in a high efficiency video coding (HEVC) encoder, the method comprising:
   receiving at least one of partition size information of a first coding unit of a largest coding unit (LCU) of a frame and prediction mode information of the first coding unit;
   performing an adaptive bit allocation operation for the first coding unit based on the at least one of the partition size information of the first coding unit and the prediction mode information of the first coding unit;
   setting a quantization parameter of the first coding unit according to the performed adaptive bit allocation operation; and
   receiving, by a video source analyzer, video source data partitioned into the first coding unit and a second coding unit and analyzing the partitioned video source data;
   wherein the adaptive bit allocation operation determines a bit allocation size $R_{CUi}$ of the first coding unit by multiplying a target bit number $T_{LCU}$ of the LCU by a sum of at least a first weighting variable based on the partition size and a second weighting variable based on an analysis of the first coding unit; and
   wherein, if a partition size of the first coding unit is greater than a partition size of the second coding unit, a first weighted value of the first coding unit is smaller than a second weighted value of the second coding unit.

2. The method of claim 1, further comprising:
   receiving at least one of the partition size information of a second coding unit of the frame and prediction mode information of the second coding unit;
   performing an adaptive bit allocation operation for the second coding unit based on the at least one of the partition size information of the second coding unit and the prediction mode information of the second coding unit; and
   setting a quantization parameter of the second coding unit according to the performed adaptive bit allocation operation.

3. The method of claim 2, wherein the performing the adaptive bit allocation operation for the second coding unit is performed in proportion to a size of the second coding unit.

4. The method of claim 2, wherein the second coding unit is included in the LCU, and a bit allocation size of the second coding unit is calculated by multiplying the target bit number of the LCU and the second weighted value.

5. The method of claim 4, wherein, if a statistical characteristic of the first coding unit is flat and a statistical characteristic of the second coding unit is not flat, the first weighted value of the first coding unit is smaller than the second weighted value of the second coding unit.

6. The method of claim 4, wherein, if a statistical characteristic of the first coding unit is complicated and a statistical characteristic of the second coding unit is not complicated, the first weighted value of the first coding unit is greater than the second weighted value of the second coding unit.

7. The method of claim 4, wherein the prediction mode information of the first coding unit indicates whether the first coding unit is in an infra mode, an inter mode, a skip mode, or a merge mode, and wherein the prediction mode information of the second coding unit indicates whether the second coding unit is in an infra mode, an inter mode, a skip mode, or a merge mode.

8. The method of claim 7, wherein, if the first coding unit is in the intra mode, the first weighted value of the first coding unit is greater than the first weighted value of the first coding unit would otherwise be used in the other modes.

9. The method of claim 1, wherein the receiving comprises receiving the partition size information, and the adaptive bit allocation operation is performed based on the partition size information without the prediction mode information.

10. The method of claim 1, wherein the adaptive bit allocation operation is performed according to:

$$R_{CUi}=T_{LCU}*(\alpha W_{Ni}+\beta W_{STAi})$$

where $\alpha W_{Ni}$ is the first weighting variable, $\beta W_{STAi}$ is the second weighting variable, $W_{Ni}$ is a weighted value based on the partition size, $W_{STAi}$ is a weighted value based on an analysis of the first coding unit, each of $\alpha$ and $\beta$ have a range between zero and one, the sum of $\alpha$ and $\beta$ is one.

11. Video encoding circuitry comprising:
a bit allocation circuit configured to perform an adaptive bit allocation operation per each coding unit of a first frame based on at least one of partition size information of a first coding unit of the first frame and prediction mode information of the first coding unit, and based on at least one of partition size information of a second coding unit of the first frame and prediction mode information of the second coding unit; and
a quantization parameter (QP) control circuit configured to set a quantization parameter of the first coding unit according to the performed first adaptive bit allocation operation, and configured to set a quantization parameter of the second coding unit according to the performed second adaptive bit allocation operation;
a video source analyzer receiving video source data partitioned into the first coding unit and second coding units and analyzing the partitioned video source data;
wherein the adaptive bit allocation operation determines a bit allocation size $R_{CUi}$ of an $i^{th}$ coding unit of a largest coding unit (LCU) of the first frame by multiplying a target bit number $T_{LCU}$ of the LCU by a sum of at least a first weighting variable based on the partition size and a second weighting variable based on an analysis of the $i^{th}$ coding unit; and
wherein, if a partition size of the first coding unit is greater than a partition size of the second coding unit, a first weighted value of the first coding unit is smaller than a second weighted value of the second coding unit.

12. The video encoding circuitry of claim 11, further comprising a QP offset control unit controlling an offset of the quantization parameter for each of the first and second coding units according to the analysis.

13. The video encoding circuitry of claim 11, wherein the adaptive bit allocation operation is performed according to:

$$R_{CUi}=T_{LCU}*(\alpha W_{Ni}+\beta W_{STAi})$$

where $\alpha W_{Ni}$ is the first weighting variable, $\beta W_{STAi}$ is the second weighting variable, $W_{Ni}$ is a weighted value based on the partition size, $W_{STAi}$ is a weighted value based on an analysis of the first coding unit, each of $\alpha$ and $\beta$ have a range between zero and one, the sum of $\alpha$ and $\beta$ is one.

14. The video encoding circuitry of claim 11, wherein the prediction mode information of the first coding unit indicates whether the first coding unit is in an intra mode, an inter mode, a skip mode, or a merge mode, and wherein the prediction mode information of the second coding unit indicates whether the second coding unit is in an intra mode, an inter mode, a skip mode, or a merge mode.

15. The video encoding circuitry of claim 11, wherein the adaptive bit allocation operation is performed according to:

$$R_{CUi}=T_{LCU}*(\alpha W_{Ni}+\beta W_{STAi}+\zeta W_{MODi})$$

where $\alpha W_{Ni}$ is the first weighting variable, $\beta W_{STAi}$ is the second weighting variable, $W_{Ni}$ is a weighted value based on the partition size, $W_{STAi}$ is a weighted value based on an analysis of the $i_{th}$ coding unit, $W_{MODi}$ is a weighted value based on the prediction mode of the $i_{th}$ coding unit, each of $\alpha$, $\beta$ and $\zeta$ have a range between zero and one, and the sum of $\alpha$, $\beta$ and $\zeta$ is one.

16. A system comprising:
encoding circuitry configured to encode a sequence of video frames;
a processor configured to control an encoding operation of the encoding circuitry;
a memory configured to store executable code for at least one of the processor and the encoder,
wherein the encoding circuitry includes:
a bit allocation circuit configured to perform an adaptive bit allocation operation per each coding unit of a first frame based on at least one of partition size information of a first coding unit of the first frame and prediction mode information of the first coding unit, and based on at least one of partition size information of a second coding unit of the first frame and prediction mode information of the second coding unit; and
a quantization parameter control circuit configured to set a quantization parameter of the first coding unit according to the performed first adaptive bit allocation operation, and configured to set a quantization parameter of the second coding unit according to the performed second adaptive bit allocation operation,
wherein the adaptive bit allocation operation determines a bit allocation size Rcui of an $i^{th}$ coding unit of a largest coding unit (LCU) of the first frame by multiplying a target bit number $T_{LCU}$ of the LCU by a sum of at least a first weighting variable based on the partition size and a second weighting variable based on an analysis of the $i^{th}$ coding unit; and wherein the adaptive bit allocation operation is performed according to:

$$R_{CUi}=T_{LCU}*(\alpha W_{Ni}+\beta W_{STAi})$$

where $\alpha W_{Ni}$ is the first weighting variable, $\beta W_{STAi}$ is the second weighting variable, $W_{Ni}$ is a weighted value based on the partition size, $W_{STAi}$ is a weighted value based on an analysis of the first coding unit, each of $\alpha$ and $\beta$ have a range between zero and one, the sum of $\alpha$ and $\beta$ is one.

17. The system of claim 16, further comprising: decoding circuitry configured to decompress the sequence of video frames previously encoded by the encoder.

18. The method of claim 1, wherein the adaptive bit allocation operation is performed according to:

$$R_{CUi}=T_{LCU}*(\alpha W_{Ni}+\beta W_{STAi}+\zeta W_{MODi})$$

where $\alpha W_{Ni}$ is the first weighting variable, $\beta W_{STAi}$ is the second weighting variable, $W_{Ni}$ is a weighted value based on the partition size, $W_{STAi}$ is a weighted value based on an analysis of the first coding unit, $W_{MODi}$ is a weighted value based on the prediction mode of the first coding unit, each of $\alpha$ and $\beta$ and $\zeta$ have a range between zero and one, and the sum of $\alpha$, $\beta$ and $\zeta$ is one.

* * * * *